United States Patent [19]

Mason

[11] 4,098,415

[45] Jul. 4, 1978

[54] METHOD FOR ROTATING HOSE

[75] Inventor: Charles E. Mason, Fairmont, W. Va.

[73] Assignee: Continental Oil Company, Ponca City, Okla.

[21] Appl. No.: 775,804

[22] Filed: Mar. 9, 1977

Related U.S. Application Data

[63] Continuation-in-part of Ser. No. 658,647, Feb. 17, 1976, abandoned.

[51] Int. Cl.$^2$ .......... B65G 53/30

[52] U.S. Cl. .......... 214/152; 137/344; 214/1 P; 214/1 QC; 214/340; 294/74

[58] Field of Search .......... 214/DIG. 3, DIG. 4, 214/1 P, 1 PA, 1 MS, 1 QC, 1 QD, 38 CA, 339–340, 95 R, 152; 294/74; 302/14, 64; 137/344

[56] References Cited

U.S. PATENT DOCUMENTS

| | | | |
|---|---|---|---|
| 851,352 | 4/1907 | Hibbins | 214/DIG. 3 |
| 3,219,199 | 11/1965 | Lagerstrom | 214/1 MS |
| 3,744,837 | 7/1973 | Foster | 294/74 |
| 3,868,964 | 3/1975 | Tarter | 137/344 |
| 3,920,039 | 11/1975 | Jamison | 137/344 |

*Primary Examiner*—Frank E. Werner
*Assistant Examiner*—George F. Abraham
*Attorney, Agent, or Firm*—Cortlan R. Schupbach, Jr.

[57] ABSTRACT

A method for rotating hose movably supported by a plurality of carts in a mine, comprising attaching a means to the roof of the mine for lifting the hose, lifting the hose using reversible hoist means, the hose resting on a support means passing under said hose, said support means having incorporated therein means for rotating the hose before replacing on the cart.

5 Claims, 2 Drawing Figures

METHOD FOR ROTATING HOSE

Figure 2:
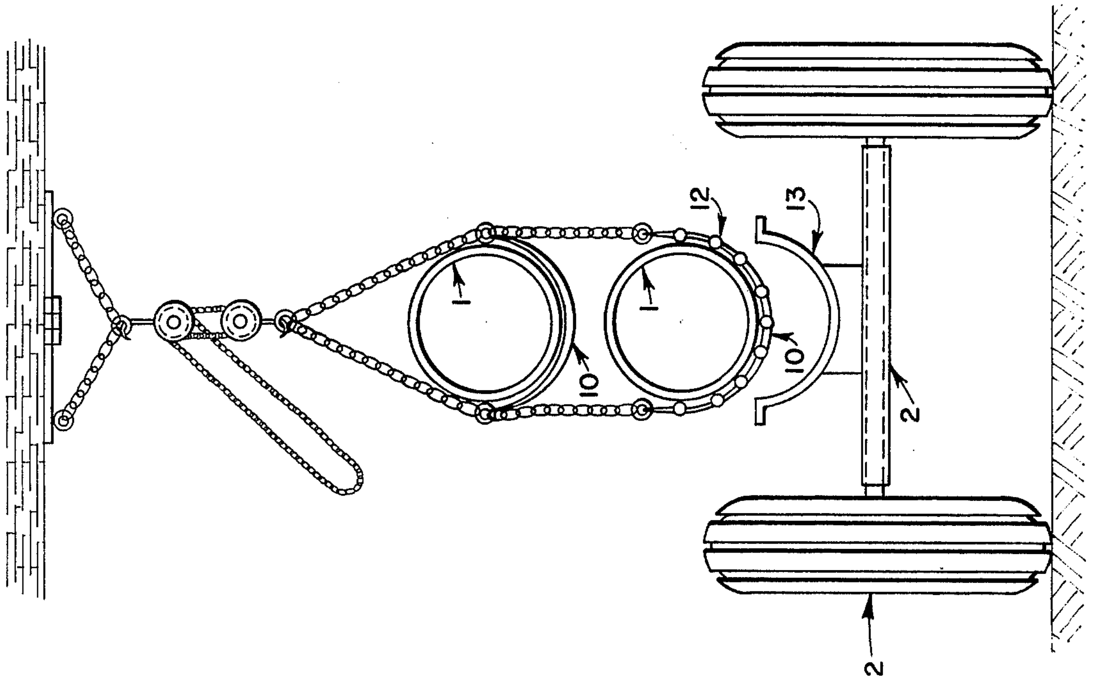

This is a continuation-in-part of application Ser. No. 658,647, filed Feb. 17, 1976 and now abandoned.

This invention relates to a method for rotating hoses while assembled inside a mine. More specifically, this invention relates to a method for rotating hoses inside a mine by lifting the hose, rotating the hose, and replacing the hose on a plurality of carts.

Modern mining techniques, especially in the coal mining industry, have developed to the point that mining machines operate continuously, sending the mined coal or minerals back to a point from which it is shopped to the surface by means of hose and pipe. Before going to the surface, the mined mineral is placed in a slurry tank and sent to the surface graded according to size. Generally, a metal pipe carries the freshly mined mineral into this slurry tank. However, for ease of mobility among the various turnings found inside underground mines, normally several lengths of hose connect the mining machine to the leading edge of the slurry pipe.

The slurry handling system normally includes at least two hoses, one for transporting water or other fluid, and the other for transporting the slurry which consists of the mined material and the fluid mixed together. Transportation of the hose is provided by a plurality of carts which are spaced along the hoses and not only support the hoses off the ground but also provide mobility to the hoses along the axis of the pipe. A certain portion of the total length of the hoses is positioned in the mine to provide storage and provide flexible, extensionable movement so that the digging machine can operate for an extended period of time without requiring the movement of fixed pipes from the terminal to the beginning of the slurry hose system.

Many publications have described methods for maintaining the hose above the floor of the mine in order to prevent abrasion on the exterior of the hose, thus leading to premature failure. However, an additional problem is encountered in the slurry system on the interior portion of the hose by the mined mineral returning to the slurry tank. This material is also very abrasive and tends to settle toward the bottom portion of the hose. This material, being extremely abrasive, tends to wear away the interior of the hose. Thus, it has been found necessary to occasionally rotate the hose so that the interior wear is relatively uniform in order to avoid premature replacement of this expensive hose.

In the past, this procedure has been extremely difficult. The hoses when full of fluid weigh approximately 100 pounds per linear foot and even when empty are extremely clumsy and difficult to handle. It has been the practice in the past to disassenble the hoses into sections of about 50 to 100 feet and manually rotate them in place. Clearly, this procedure requires much effort and many man-hours for the disassembly, rotation, reassembly, and refilling of the hoses.

It would therefore be of great benefit to provide a method whereby the hose can be rotated in place without the necessary assembling and disassembling which have accompanied prior art procedures.

It is therefore an object of the present invention to provide a method of rotating an assembled hose inside an underground mine. Other objects will become apparent to those skilled in this art as the description proceeds.

It has now been found in accordance with the present invention that a simple but efficient means for turning the hose while assembled inside an underground mine is feasible. Briefly, the invention concerns a method for rotating the hose movably supported by plural carts in a mine comprising (a) means for attaching the apparatus to the roof of the mine, (b) reversible hoist means for lifting the hose from said carts, (c) means for connecting the hoist means to the attaching means, (d) support means passing under said hose having roller means incorporated therein, and (e) means for connecting the support means to the hoist means.

The prior art contains many examples of load handling devices and turning apparatus for moving heavy, clumsy materials. Examples of such apparatus can be found in U.S. Pat. Nos. 3,545,629, 1,876,290, 2,338,285, and 2,565,740. However, all these patents and many others have one disadvantage which prohibits their use in an underground mine: the necessity of massive and relatively immobile support equipment. Clearly, in the limited space available in an underground mine, such equipment is not feasible nor practical. The use of any of these teachings would necessitate even more time and expense than is currently encountered in order to put them to use.

The apparatus of the instant invention is designed to allow a simple but efficient method for rotating the hoses. The apparatus is designed to be used in multiples, dependent upon the length and the size of the hose to be rotated. Briefly stated, directly over the hose which is to be rotated, a plate is attached to the roof of the mine by conventional means such as a roof bolt. To this plate is attached a hoist capable of sustaining that portion of the weight of the assembled hose which must be lifted. A connecting means consisting of a chain or a strap is connected to the hoist on one end and at the other to a supporting means which is passed under the hose to be lifted. The supporting means will normally consist of a strap or a chain having mounted therein rollers or roller balls to enable free movement of the hose. The hose is then disconnected from the cart and the clamps which hold it in place and is lifted all along its length by the numerous hoists. The hose can then be easily rotated in either direction as far as is desired, using a minimum amount of force. At the conclusion of the rotation, the hoist is reversed, and the hose is lowered to its original position on the cart and is reclamped into place before being refilled.

While the process of the instant invention is applicable to hoses both filled and empty, it is desirable when considering the size and weight of most hose used in most underground mines to empty the hose before rotating. However, the hose need not be disassembled into its components but may be rotated as a whole, thus saving much labor and many manhours.

Where the hoses are stacked one on top of another, as many hoses may be lifted using multiple support means as there is head room above said hoses. However, normally more than two hoses will not be lifted at any one time. The support of more hoses would depend, of course, upon the size of the hose, the weight of the hose, and the number of supports available.

When not in use, the rotating means of the present invention are easily stored, require little space, and are completely mobile, dependent upon the roof of the mine to which they will be attached when in use.

Figure 1:
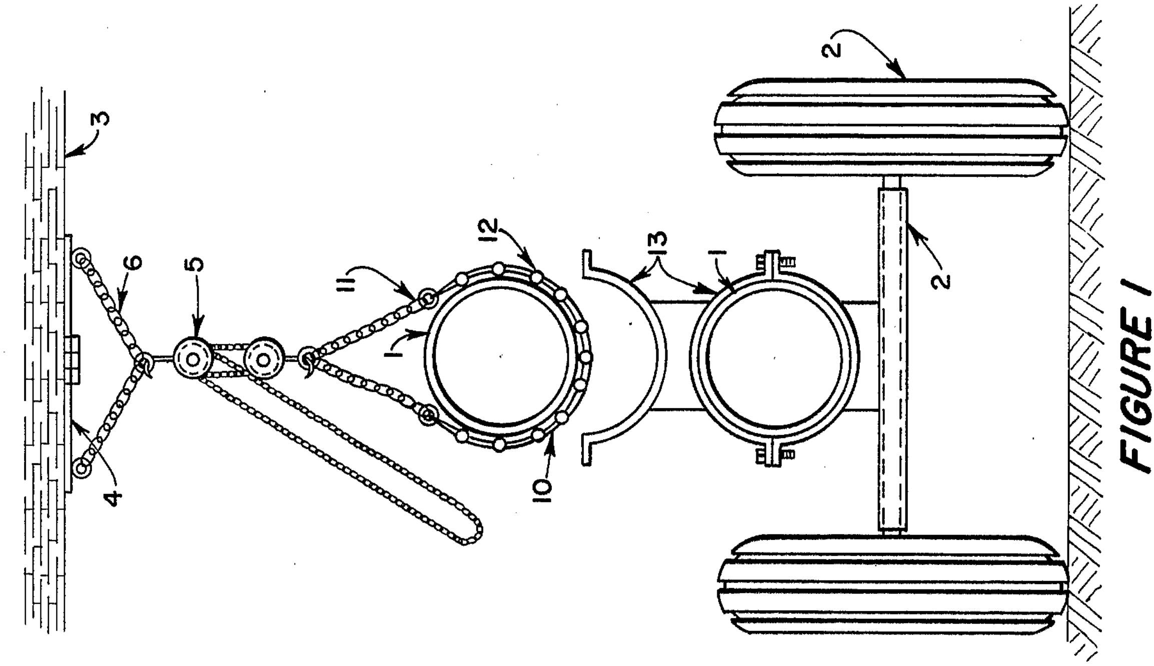

The method of the instant invention is more concretely described with reference to the drawings which describe the apparatus used. FIG. 1 describes the lifting of a single hose from one of a plurality of moveable carts 2. The lifting apparatus is affixed to the mine roof 3 by attaching means 4, to which is connected 6 a reversible hoist means 5. A support means 10 is passed under the hose to be lifted, and is in turn connected 11 to the reversible hoist means 5. The support means contains roller means 12 to allow the hose to be rotated once free of the cart clamps 13. Once rotated as desired, the hose is lowered to position on the clamps and secured prior to filling and use.

FIG. 2 described the lifting of a plurality of hoses 1 from one of a plurality of carts 2. Only the lower support member 10 contains roller means 12, but each can contain roller means, as if, for example, both hoses are to be rotated at once.

The method therefore comprises rotating hose sections (connected to adjoining sections) to allow uniform interior wear, said hose sections being movably supported by a plurality of carts in an underground mine, comprising:

(a) attaching a plurality of reversible hoist means to the roof of the mine,
(b) passing at least one support means having roller means incorporated therein under said hose,
(c) connecting said support means to said hoist means,
(d) lifting said hose from said carts using the hoist means, rotating said hose as desired, and,
(e) reversing said hoist to lower said hose to said carts in a rotated position.

A method for rotating hose in an underground mine has been described. A preferred embodiment is shown in FIGS. 1 and 2 which provides a simple means for lifting a slurry hose transportation system from the plural carts on which it is transported inside a mine and rotating the hose as far as desired before replacing and refilling.

It will be apparent to those skilled in this art that many substitutions can be made herein without departing from the spirit or the scope of the present invention. For example, either chains or straps can be used between the hoist and the supporting means. In addition, instead of bolting to the roof a simple brace could be utilized to support the hoist.

While certain embodiments and details have been shown for the purpose of illustrating this invention, it will be apparent to those skilled in this art that various changes and modifications may be made herein without departing from the spirit or the scope of the invention.

I claim:

1. A method for rotating hose sections to allow uniform interior wear, said hose sections being movably supported by a plurality of carts in a underground mine, the method comprising:

(a) attaching a plurality of reversible hoist means to the roof of the mine,
(b) passing at least one flexible support means having roller means incorporated therein under said hose,
(c) connecting said support means to said hoist means, and
(d) lifting said hose from said carts using the hoist means, rotating said hose as desired, and,
(e) reversing said hoist to lower said hose to said carts in a rotated position.

2. A method as described in claim 1 wherein said hoist is attached to said roof by roof bolts.

3. A method as described in claim 1 wherein substantially flexible straps containing cylindrical roller or spherical roller means are used to support said hose.

4. A method as described in claim 1 wherein more than one support means is used for lifting said hose.

5. A method as described in claim 1 wherein chains are used to connect said hoist means and said support means.

* * * * *